United States Patent [19]

Zemel et al.

[11] Patent Number: 4,902,788

[45] Date of Patent: Feb. 20, 1990

[54] CROSSLINKED CYCLODEXTRINS SUPPORTED ON POROUS REFRACTORY INORGANIC OXIDES

[75] Inventors: Haya Zemel; Mark B. Koch; Ronald P. Rohrbach, all of Des Plaines, Ill.

[73] Assignee: UOP, Des Plaines, Ill.

[21] Appl. No.: 250,653

[22] Filed: Sep. 29, 1988

[51] Int. Cl.$^4$ .................. C07H 1/00; C08B 33/04; C08B 37/00; C13K 37/00

[52] U.S. Cl. .................. 536/1.1; 536/103; 536/106; 536/110; 527/300; 527/311; 428/402; 428/532

[58] Field of Search ............ 428/402, 532; 527/300, 527/311; 536/1.1, 103, 106, 110

[56] References Cited

U.S. PATENT DOCUMENTS 3,472,835 10/1969 Buckler et al. .................. 260/209

FOREIGN PATENT DOCUMENTS 2165549A 4/1986 United Kingdom .

OTHER PUBLICATIONS

J. Szejtli, *Starch*, 34, 379-385 (1982).
R. D. Yang and A. E. Humphrey, *Biotech, Bioeng.*, 17, 1211-1235 (1957).

*Primary Examiner*—John Kight
*Assistant Examiner*—Carlos Azpuru
*Attorney, Agent, or Firm*—Thomas K. McBride; Eugene I. Snyder

[57] ABSTRACT

Composites on a porous support of an insolubilized, crosslinked cyclodextrin show improved mass transfer characteristics relative to discrete particles of the same insolubilized cyclodextrin. Dicarboxylic acid dihalides are particularly effective crosslinking agents. The composites can be prepared quite simply and cost effectively by impregnating a support, such as alumina, with a cyclodextrin, then reacting the cyclodextrin within the impregnated support with a suitable dicarboxylic acid dihalide, such as one from the alkane dicarboxylic acid series containing from 4 through 12 carbon atoms.

15 Claims, 1 Drawing Sheet

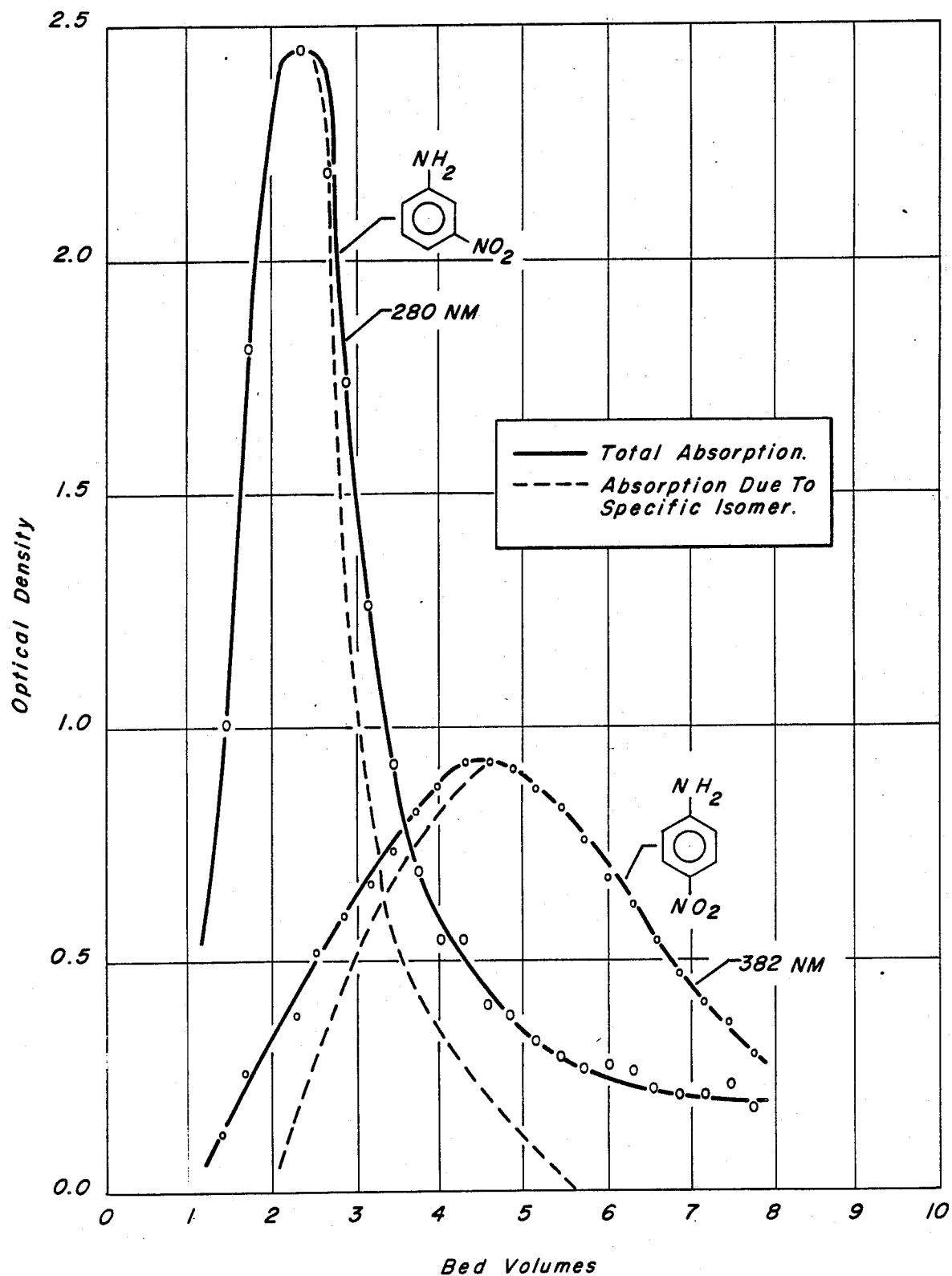

CROSSLINKED CYCLODEXTRINS SUPPORTED ON POROUS REFRACTORY INORGANIC OXIDES

BACKGROUND OF THE INVENTION

Cyclodextrins are cyclic molecules consisting of 1–4 linked alpha-D-glucopyranose monomeric units. The cyclodextrins containing 6-, 7-, and 8-glucose units joined to form a ring, commonly known as alpha-, beta-, and gamma-cyclodextrin, respectively, are the most important cyclodextrins to date, possibly because of their availability relative to cyclodextrins of different ring size. The usefulness of these cyclodextrins arises from their ability to reversibly form inclusion complexes, or clathrates, with many types of compounds. Inclusion complexes arise when a host molecule, such as a cyclodextrin, has a structure containing an interior cavity into which guest molecules can bind by weak interactions such as van der Waal's forces. The latter are short range forces which are sufficiently strong to allow the formation of definite, generally solid complexes, but are sufficiently weak to permit ready dissociation of the complex to a host and guest molecule under appropriate conditions.

The cyclodextrins are doughnut-shaped molecules with an interior cavity whose size and shape is determined by the number of glucose units that make up the ring. In alpha-cyclodextrin the almost cylindrical cavity is approximately 7 angstroms deep and 5 angstroms in diameter. In beta-cyclodextrin the depth is the same but the diameter is 7 angstroms, and in gamma-cyclodextrin cavity is again 7 angstroms deep but is 9 angstroms in diameter. Cyclodextrins are soluble in water because of the many hydroxyl groups of the glucose subunits that surround the rim of the cavity. However, the interior of the cavities themselves is hydrophobic, and these hydrophobic cavitives extract organic molecules from aqueous solution if the organic materials have the correct shape and hydrophobic character.

The complexing ability of cyclodextrins lends itself to various uses. For example, the cyclodextrins are used in encapsulating desirable flavors and fragrances which can then be stored for reasonably long periods of time and added to foods at their preparation. Reciprocally, cyclodextrins may be used in removing undesirable flavors and fragrances from food by complexing with them. Cyclodextrins also are used in the protection of foods against oxidation, photochemical degradation, and thermal decomposition. These and other uses have been summarized by J. Szejtli, *Starch*, 34, 379–385 (1982)

Although in some applications the use of the water soluble cyclodextrins themselves are appropriate, in other cases it is more desirable to employ an insolubilized cyclodextrin to more readily enable its extended use or to enable its incorporation in a continuous process. For example, when cyclodextrins are employed for their ability to separate various components, as in gas phase chromatography or high pressure liquid chromatography, the water soluble cyclodextrins have obvious limitations and some sort of solid phase incorporating cyclodextrins is needed. Another example is the use of cyclodextrins to removed bitter components in citrus juice where it is desired to pass the juice over a solid bed incorporating cyclodextrins to give an effluent of reduced bitterness.

These needs previously have been recognized, and one general solution is the preparation of polymeric cyclodextrin derivatives as resins having properties appropriate for a solid support in chromatographic applications or for use as a fixed bed in continuous processes. Buckler et al. in U.S. Pat. No. 3,472,835 recognized the need for insolubilized cyclodextrins as "molecular sieves" in the separation and purification processes and offered as a general solution insoluble derivatives prepared from the reaction of cyclodextrins with compounds having at least two hydroxyl-reactive functional groups per molecule. The patentee disclosed a large class of suitable polyfunctional compounds, including dicarboxylic acid dihalides, and exemplified several insoluble polymeric cyclodextrin derivatives suitable for use in numerous described applications.

The limited porosity of such prior art resins impedes the diffusivity of guest molecules and seriously curtails the capacity of the resin to bind with typical guest molecules, both of which are marked disadvantages. It was reasoned that increasing the effective porosity of the insolubilized cyclodextrins prepared by crosslinking cyclodextrin with dicarboxylic acid dihalides could increase their binding kinetics and their discrimination, substantially improving the utility in commercial processes. In particular, it appeared that if a thin film of an insolubilized cyclodextrin were supported on a porous refractory inorganic oxide with retention of at least a major part of the cyclodextrin's complexing selectivity, not only might the mass transport limitations of a nonporous, unsupported solid resin be overcome, at least in part, but the supported resin would have good flow characteristics, high incompressibility, crush strength, and abrasion resistance, all desirable characteristics for material used in a fixed or packed bed. The invention to be described pertains to such supported insolubilized cyclodextrins where the cyclodextrin is crosslinked by dicarboxylic acid dihalides on the surface of a porous refractory inorganic oxide. The increase in porosity affords a product with improved kinetics of guest molecule inclusion and greater selectivity relative to discrete resin particles.

SUMMARY OF THE INVENTION

The purpose of this invention is to overcome the mass transfer limitations inherent in discrete particles of insolubilized cyclodextrins. This purpose is achieved by supporting insolubilized cyclodextrins on a porous refractory inorganic oxide. In an embodiment the cyclodextrin is crosslinked by an aliphatic dicarboxylic acid dihalide on a porous alumina as a support. In a more specific embodiment the acid halide is glutaryl, succinyl, or adipyl chloride. In a yet more specific embodiment the finished composite has from about 1 to about 20 weight percent of the insolubilized cyclodextrin.

DESCRIPTION OF THE FIGURE

The FIGURE shows the optical density of eluate at 280 and 382 nanometers vs. bed volume where a mixture of meta- and para-nitroaniline is separated by supported crosslinked cyclodextrin; see Example III.

DESCRIPTION OF THE INVENTION

In one aspect the invention to be described is a composite of a porous refractory inorganic oxide which has dispersed on it a cyclodextrin which has been insolubilized by being crosslinked with a dicarboxylic acid dihalide. In another aspect the invention is a method of making the composite described above where a porous refractory inorganic oxide is impregnated with a cyclodextrin and the impregnated cyclodextrin is reacted in situ with a dicarboxylic acid dihalide to form an insolubilized, crosslinked cyclodextrin which is dispersed throughout the support.

Porous refractory inorganic oxides are the supports of choice in the practice of this invention. Those oxides especially suitable in the practice of this invention include silica, alumina, titania, magnesia, zirconia, thoria, boria, and combinations thereof. It is necessary for the support to be porous, and in this context the surface area, which may be viewed as one index of porosity, is desirably at least about 5 square meters per gram ($m^2/g$), although a surface area more than about 20 $m^2/g$ is preferred. Among the refractory inorganic oxides alumina is particularly preferred, and gamma-alumina is especially desirable because of the relatively high porosities which may be achieved with this material.

In the composite the porous inorganic refractory oxide as a support has dispersed thereon at least one crosslinked and insolubilized cyclodextrin which is the reaction product of a cyclodextrin and certain dicarboxylic acid halides. By "insolubilized" is meant that the crosslinked cyclodextrin is soluble in water at about 25° C. to an extent less than about 200 ppm. The cyclodextrins which are crosslinked in the practice of this invention may be either natural or synthetic cyclodextrins. The natural cyclodextrins include alpha-cyclodextrin, beta-cyclodextrin, and gamma-cyclodextrin. The synthetic cyclodextrins include, for example, branched cyclodextrins such as those illustrated and exemplified in G.B. 2,165,549.

The cyclodextrin to be crosslinked is reacted with a dicarboxylic acid dihalide having as its parent a linear alkane dicarboxylic acid, $HO_2C(CH_2)_nCO_2H$, where n is an integer from 1 through about 8. Examples of such alkane dicarboxylic acids include malonic acid, succinic acid, adipic acid, glutaric acid, pimelic acid, suberic acid, azelaic acid, and sebacic acid, with some preference being expressed for succinic, glutaric and adipic acids. Other acids which may be employed, although not necessarily with equivalent results, include phthalic acids, ring-substituted phthalic acids, and the hexahydro counterparts of phthalic and ring-substituted phthalic acids. By phthalic acids are included phthalic acid, terephthalic acid, and isophthalic acid. The aromatic ring in phthalic acid also may bear inert substituents, such as alkyl groups containing from 1 to 10 carbon atoms, alkoxy groups containing 1 to 10 carbon atoms, halogens, and aryl groups, especially the phenyl group. The chief disadvantage of aromatic dicarboxylic acids is the relatively low yield of resin formed when they are employed.

The dicarboxylic acid dihalide used is usually the chloride, in part because it is most conveniently available. However, acid bromides, fluorides, and to a lesser extent, the iodides may be used although not necessarily with results which are the same in all respects. The molar proportion of the dicarboxylic acid dihalide to cyclodextrin may range from about 1:1 up to about 20:1. Higher ratios may be utilized without any apparent detriment but with no apparent benefit, and the use of lower ratios affords lower yields. The optimum molar ratio of dicarboxylic acid dihalide to cyclodextrins appears to be in the range from about 8:1 to about 12:1 but can readily be determined without undue experimentation.

These are few operational limitations on the amount of crosslinked cyclodextrin in the composite. As a practical matter, a finished product with less than 1 weight percent resin has insufficient capacity for most applications, and one with more than about 25 weight percent resin is too heavily loaded to make full advantage of the increased porosity benefits.

In practice a finished product containing from about 2 to about 20 weight percent of the crosslinked cyclodextrin is most often used. As described below, one can readily vary the amount of crosslinked cyclodextrin in the finished product during its preparation. However, some facets of its preparation also may engender some variability in crosslinked cyclodextrin content; vide infra.

Crosslinking of the cyclodextrin is done in situ. That is, the support is first impregnated by the cyclodextrin, and the cyclodextrin which is dispersed on the support is then crosslinked upon contact with the dicarboxylic acid halide. What is believed is happening is absorption of the cyclodextrin onto the surface of the porous refractory inorganic oxide during impregnation, a surface which includes the pores of the oxide accessible to the cyclodextrin by diffusion. Upon contact with a dicarboxylic acid halide, the absorbed cyclodextrin is crosslinked and insolubilized on the surface of the support, which is to say that some of the cyclodextrin is trapped within the pores to afford a crosslinked network quite resistant to abrasion and physical removal to afford a mechanically stable stucture.

The composites of this invention are prepared by first impregnating the porous inorganic refractory oxide used as a support by contacting the support with a solution of a cyclodextrin followed by evaporation of the solvent so as to disperse the cyclodextrin throughout the support. The choice of solvent is not critical so long as it is unreactive under the reaction conditions. Dissolution of at least the natural cyclodextrins requires a polar solvent, and dipolar aprotic solvents are particularly useful ones. Among such solvents are included dimethylformamide, dimethylsulfoxide, N-methylpyrrolidone, hexamethylphosphoramide, and dimethylacetamide. Pyridine also can be used as a solvent where its basic properties are not a detriment. The solution is usually on the order of 0.1–0.2 molar in cyclodextrin although this is not a parameter which substantially affects the outcome. The total amount of cyclodextrin solution used determines the amount of cyclodextrin deposited on the support, which in turn determines, at least in part, the weight percent of the crosslinked cyclodextrin in the finished product. The support is slurried with the solution of cyclodextrin for a time sufficient to allow diffusion of the latter into the pores, which may be for a time from minutes to hours depending upon the nature of the solid, the concentration of solute, nature of solvent, amount of material to be impregnated, and so forth, but which is readily determined by one practicing this art. After sufficient contact time the solvent is then removed by evaporation, generally at reduced pressure so as to avoid unnecessary heating, to afford an impregnated porous refractory inorganic oxide on which the cyclodextrin is well dispersed.

The cyclodextrin in the impregnated porous inorganic oxide is then reacted with a dicarboxylic acid dihalide, the latter having been previously described. This reaction is effected by contacting the solid support with a solution of the dicarboxylic acid dihalide. Strictly speaking, the solvent used need only dissolve the acid chloride, in which case the reaction occurs heterogeneously. Because heterogeneous reactions usually are slower than homogeneous reactions, there is some advantage to effecting the reaction in a solvent in which both the dicarboxylic acid dihalide and cyclodextrin are soluble so that the crosslinking reaction occurs homogeneously. However, the disadvantage of using a solvent in which the cyclodextrin is soluble is that some of the cyclodextrin may be removed from the inorganic oxide prior to reaction, leading to a lower weight percent of crosslinked cyclodextrin in the finished product. This also leads to some variability in the amount of crosslinked cyclodextrin in the finished product depending upon the kind and extent of agitation, the temperature, the amount of solvent used as well as concentration of dicarboxylic acid dihalide in solution. Whether one conducts the crosslinking under conditions where the cyclodextrin is soluble, or whether one chooses a solvent for reaction in which the cyclodextrin is insoluble, is a matter of choice.

Crosslinking of the cyclodextrin by a dicarboxylic acid dihalide is performed using from about 1 to about 20 molar proportions of dicarboxylic acid dihalide relative to impregnated cyclodextrin. It has been found preferable to use a molar proportion from about 8:1 to about 12:1, although higher molar proportions can be used without detriment, but also without any apparent benefit. After reaction is complete, solid is separated from the reaction mixture and washed well to remove any unreacted dicarboxylic acid dihalide. Because the composite usually is used in an aqueous environment, the recovered solid usually is washed last with water to remove all traces of water soluble material which would leach during use of the composite. The composite is then dried, commonly merely by air drying, and stored until use.

The following examples are merely illustrative of this invention and are not intended to limit it in any way. The use of particular cyclodextrins or dicarboxylic acid dihalides is merely given in a representative capacity.

EXAMPLE I

General Method of Preparation

A mixture of alumina and a solution of a cyclodextrin in dimethylformamide (DMF) was mixed well until a homogeneous slurry was obtained. The solvent, dimethylformamide, and cyclodextrin were previously dried. Solvent then was removed by evaporation either at an elevated temperature, at reduced pressure, or a combination of both. The resulting dried impregnated alumina was then added to a solution of a dicarboxylic acid chloride in a suitable solvent of sufficient volume calculated to afford the appropriate molar proportions of dicarboxylic acid dihalide relative to the absorbed cyclodextrin. After crosslinking was complete, solid was separated and washed with water and with ethanol.

To a solution of 3.6 grams of beta-cyclodextrin in 60 mL of dimethylformamide were added 36.4 g of 60–80 mesh alumina. Additional DMF (100 mL) was added and the mixture was stirred to effect a homogeneous slurry. Solvent was evaporated at reduced pressure and the solid was further dried for 4 hours at 110° C. In a nitrogen purged glove bag, 40 g of the resulting dried alumina-coated cyclodextrin in a 1 L beaker was mixed with enough DMF to make a thick paste. Glutaryl chloride (0.038 moles, 4.91 mL) was added to the paste and mixed with a spatula for one minute or until the crosslinker was well dispersed. In 10 minutes, polymerization occurred, evidenced by a thickening of the mixture and heat generation. The supported resin was allowed to cool for 15 minutes and removed from the glove bag. Acetone (800 mL) was added over the resin, and the supported resin was allowed to soak in the acetone for 16 hours. The acetone was poured off, and washed with 800 mL of water four times with 30 minutes soaking between washings. The suported resin was then soaked in 800 mL of 200 proof denatured ethanol for two hours. The ethanol was poured off and the resin soaked in 800 mL of water. The water was poured off and the supported resin soaked again in 800 mL of ethanol for 2 hours. The ethanol was decanted and the supported resin dried at 100° C. Sieving was done to a cutoff of 80 mesh to yield 40 grams of alumina supported CD resin.

EXAMPLE II

Characteristics of Supported Crosslinked Beta-Cyclodextrin

Both succinyl- and glutaryl-crosslinked beta-cyclodextrin were prepared on a support of 40–60 mesh gamma alumina according to the prior description. The performance of the various resins was evaluated by comparing their phenol extraction capability by two different procedures. The first was performed by adding 0.1 g of the composite containing crosslinked cyclodextrin polymer to 2 mL of an aqueous solution containing 200 ppm phenol. After 2 hours, 0.1 mL of the filtered solution was analyzed four unbound phenol via the assay of R. D. Yang and A. E. Humphrey, *Biotech. Bioeng.*, 17, 1211–1235 (1957). The phenol uptake of the composite at the 200 ppm level was expressed as the percent phenol removed from solution. The second test was the determination of the Langmuir isotherm. In this determination 4 to 7 concentrations of phenol ranging from 200–20,000 ppm were tested against 0.1 g samples of the supported resin in a procedure analogous to the foregoing one except that the samples may be mixed for two hours or allowed to remain overnight. From an isotherm the theoretical capacity and the binding constant were determined. The capacity is given below as the weight of phenol, in milligrams, taken up by 1 g of resin. Results are summarized below.

TABLE 1

Characteristics of Crosslinked Beta-Cyclodextrin Supported on Gamma Alumina

| Resin | Weight % Resin in Finished Composite | Percent Phenol Removed | Phenol Removed ppm/0.1 g Resin | Langmuir Capacity mg/g |
|---|---|---|---|---|
| Succinyl-BCD | 5.4 | 8.2 (87) | 304 (174) | 6.3 |
| Glutaryl-BCD | 13.9 | 12 (77) | 173 (154) | |

Comparison of the percent phenol removed by supported resin with percent removed by pure resin particles (numbers in parenthesis), and especially comparison of column 4, shows that on a weight basis the supported resin is more effective than its unsupported counterpart.

EXAMPLE III

Separation of m- and p-Nitroanilines

A composite containing 5 weight percent of succinyl-crosslinked beta-cyclodextrin on 25–60 mesh gamma alumina was used in the separation of a $2 \times 10^{-3}$ molar solution of mixed nitroanilines. A $1 \times 3.8$ cm column (3 mL composite) was eluted with water at a flow rate of 5 mL per minute (100 bed volumes per hour) to afford the separation depicted in FIG. 1. A qualitative comparison between unsupported and supported resin in shown below.

TABLE 2

| Comparison of Some Performance Characteristics | | | |
| --- | --- | --- | --- |
| Resin | Capacity | Separation | Kinetics |
| Unsupported | High | Good | Slow |
| Supported | Good | Good | Good |

What is claimed is:

1. A composite of a supported insolubilized cyclodextrin comprising a particulate porous refractory inorganic oxide having dispersed thereon a crosslinked cyclodextrin which is the reaction product of a cyclodextrin with from 1 to about 20 molar proportions of a dicarboxylic acid dihalide, where the crosslinked cyclodextrin is from about 1 to about 25 weight percent of the finished product.

2. The composite of claim 1 where the particulate porous refractory inorganic oxide is selected from the group consisting of alumina, silica, titania, magnesia, zirconia, boria, thoria, and combinations thereof.

3. The composite of claim 2 where the inorganic oxide is alumina.

4. The composite of claim 3 where the alumina is gamma-alumina.

5. The composite of claim 1 where the cyclodextrin is selected from the group consisting of alpha-cyclodextrin, beta-cyclodextrin, gamma-cyclodextrin or a modified cyclodextrin.

6. The composite of claim 5 where the cyclodextrin is alpha-cyclodextrin.

7. The composite of claim 5 where the cyclodextrin is beta-cyclodextrin.

8. The composite of claim 5 where the cyclodextrin is gamma-cyclodextrin.

9. The composite of claim 1 where the dicarboxylic acid halide has as its parent a dicarboxylic acid selected from the group consisting of $HO_2C(CH_2)_nCO_2H$, where n is an integer from 1 to about 8, phthalic acids, ring-substituted phthalic acids, hexahydrophthalic acids, or any combination thereof.

10. The composite of claim 9 where the parent acid is selected from the group consisting of malonic, succinic, glutaric, adipic, pimelic, suberic, azelaic and sebacic acids, or any combination thereof.

11. The composite of claim 10 where the acid is succinic acid.

12. The composite of claim 10 where the acid is glutaric acid.

13. The composite of claim 10 where the acid is adipic acid.

14. The composite of claim 1 where the crosslinked cyclodextrin is the reaction product of a cyclodextrin with from about 8 to about 12 molar proportions of a dicarboxylic acid dihalide.

15. A method of preparing a porous supported insolubilized cyclodextrin comprising impregnating a support with a cyclodextrin, reacting the impregnated cyclodextrin with from 1 to about 20 molar proportions of a dicarboxylic acid dihalide to form impregnated insolubilized crosslinked cyclodextrin, and recovering the resulting supported insolubilized cyclodextrin.

* * * * *